UNITED STATES PATENT OFFICE 2,230,654

TETRAFLUOROETHYLENE POLYMERS

Roy J. Plunkett, Wilmington, Del., assignor to Kinetic Chemicals, Inc., Wilmington, Del., a corporation of Delaware No Drawing. Application July 1, 1939,
Serial No. 282,437

3 Claims. (Cl. 260—94)

A. This invention relates to new compositions of matter, being polymers of exceptional properties.

B. At the present time there are no totally satisfactory materials for handling certain corrosive agents, such as hydrofluoric acid, or for protecting workers against the fumes which arise from such reagents. Goggles having glass disks are attacked by the fumes, and shortly become unserviceable.

C. It is an object of the invention to provide a new composition of matter which is highly resistant to corrosive influences and to oxidation, and which can be molded and spun and put to a wide variety of uses where its peculiar properties would be advantageous.

D. The objects of the invention are accomplished by the compositions of matter which may be formed by the polymerization of tetrafluoroethylene. Other objects of the invention are accomplished by the process of polymerizing the fluoroethylene herein set forth.

E. I have discovered that tetrafluoroethylene will polymerize at ordinary temperatures when subjected to super-atmospheric pressure. I have also discovered that the rate of polymerization may be quickened by carrying out the polymerization under pressure in the presence of a catalyst. Furthermore, I have discovered that the polymerization of tetrafluoroethylene can be carried out advantageously in the presence of a solvent.

F. The following examples, which are summarized in the table, illustrate but do not limit the invention.

Table

| Example | Parts $C_2F_4$ | Time, days | Temp., °C. | Catalyst, and solvent for monomer | Yield, parts | Yield, percent |
|---|---|---|---|---|---|---|
| I | 8.5 | 10 | 25 | None | 0.6 | 7.1 |
| II | 7.8 | 21 | 20 | ---do--- | 0.05 | 0.64 |
| III | 7.3 | 21 | 20 | 0.1 pt. $ZnCl_2$ | 0.1 | 1.37 |
| IV | 5.4 | 3 | 25 | 0.1 pt. $AgNO_3$ | 0.05 | 0.97 |
| V | 6.8 | 10 | 25 | 0.1 pt. $AgNO_3$ | 0.3 | 4.4 |
| VI | 7.0 | 21 | 25 | 0.1 pt. $AgNO_3$ | 2.3 | 33 |
| VII | 4.0 | ------ | 25 | 0.1 pt. $AgNO_3$, 2.5 methyl alcohol | Jelly | |
| VIII | 4.5 | 3 | 25 | 0.1 pt. $AgNO_3$, 2.2 methyl alcohol | 1.3 | 29 |
| IX | 7.4 | ------ | 25 | 0.1 pt. $AgNO_3$, 3.3 methyl alcohol | 2.0 | 27 |
| X | 8.8 | 21 | 25 | 0.1 benzoyl perox | 0.05 | 0.57 |
| XI | 3.5 | ------ | 50 | None | ------ | ------ |

Example I

Tetrafluoroethylene (8.5 parts) was placed in a steel cylinder under pressure and allowed to stand for 10 days at 25° C. At the end of this time the unpolymerized tetrafluoroethylene was removed, leaving a residue of 0.6 part of white solid polymer. The yield was 7.1% or a polymerization rate of 0.71% per day.

Example II

Tetrafluoroethylene (7.8 parts) was placed in a container under pressure at 20° C. The yield of polymer after 21 days was 0.05 part or 0.64%.

Example III

Tetrafluoroethylene (7.3 parts) was placed in a container with 0.1 part of zinc chloride, under pressure and maintained at a temperature of 20° C. The yield of polymer after 21 days was 0.1 part or 1.37%.

Example IV

Tetrafluoroethylene (5.4 parts) was placed in a container with 0.1 part of silver nitrate, under pressure at 25° C. After three days the container was completely filled with spongy white polymer. This material was partially polymerized tetrafluoroethylene, and had a very high vapor pressure. Yield of completely polymerized material was 0.05 part or 0.93%.

Example V

Tetrafluoroethylene (6.8 parts) was placed in a container with 0.1 part of silver nitrate under pressure at 25° C. The container was completely filled with partially and completely polymerized tetrafluoroethylene. Yield of completely polymerized product was 0.3 part or 4.4% in 10 days.

Example VI

Tetrafluoroethylene (7 parts) and 0.1 part silver nitrate were placed in a container under pressure at a temperature of 25° C. for 21 days. The yield of polymer was 2.3 parts or 33%.

*Example VII*

Tetrafluoroethylene (4.0 parts) was placed in a container under pressure with 0.1 part silver nitrate and 2.5 parts methyl alcohol, and maintained at 25° C. After a short period a jelly like polymer was formed.

*Example VIII*

Tetrafluoroethylene (4.5 parts) was placed in a container with 0.1 part silver nitrate and 2.2 parts of methyl alcohol under pressure at 25° C. Polymerization began immediately with the formation of a jelly like mass. In three days this had solidified to a brown powder which had properties similar to those of the white polymer. The yield was 1.3 parts or 29%.

*Example IX*

Tetrafluoroethylene (7.4 parts) was placed in a container with 0.1 part of silver nitrate and 3.3 parts of methyl alcohol under pressure at 25° C. The yield of the brown polymer was 2.0 parts or 27%.

*Example X*

Tetrafluoroethylene (8.8 parts) was placed in a container with 0.1 part of benzoyl peroxide under pressure at 25° C. The yield of polymer after 21 days was 0.05 part or 0.57%.

*Example XI*

Tetrafluoroethylene (3.5 parts) was placed in a container under pressure at 50° C. Polymerization in this case was more rapid than at lower temperatures.

G. Reaction is not limited to temperature, although the rate of polymerization at temperatures as low as −80° C. is slow. The rate increases with the temperature and this factor may be used to produce higher yields in shorter times. In general, it may be stated that the temperatures and pressures to be employed are limited only by the economics of the process.

H. The polymers of tetrafluoroethylene are white or brown powders or jellies, which are insoluble in the usual solvents and are inert to the usual chemical reagents. These polymers become incandescent in the presence of a flame but do not burn when the flame is removed, and melt only at red heat. The polymers are insoluble in hot or cold water, acetone, ether, petroleum ether, ethyl alcohol, iso-amyl alcohol, carbon tetrachloride, $C_2F_3Cl_3$, dichlorobenzene, ethyl acetate, pyridine, nitrobenzene, 30% NaOH, petroleum oil, glacial acetic acid, concentrated sulfuric acid and concentrated nitric acid.

I. The inertness of this polymer to chemical reagents, its insolubility, and its resistance to heat and to fire make its use desirable in many places. By the use of sufficiently high pressure and temperature it can be molded into articles which are relatively clear and colorless. Such articles are laboratory apparatus for handling corrosive reagents, disks for goggles used in corrosive atmospheres, such as those which pervade certain chemical plants, and the material may be extruded into fibers which can be used in the manufacture of heat-resistant clothing and the like.

J. As many apparently widely different embodiments of this invention may be made without departing from the spirit and scope thereof, it is to be understood that I do not limit myself to the specific embodiments thereof except as defined in the appended claims.

I claim:
1. Polymerized tetrafluoroethylene.
2. The process of polymerizing tetrafluoroethylene which comprises subjecting it to superatmospheric pressure.
3. The process of polymerizing tetrafluoroethylene which comprises subjecting it to superatmospheric pressure in the presence of a catalyst.

ROY J. PLUNKETT.